US008015500B2

(12) United States Patent
Mita

(10) Patent No.: US 8,015,500 B2
(45) Date of Patent: Sep. 6, 2011

(54) DATA RETRIEVAL DEVICE WITH FUNCTION FOR MODIFYING RETRIEVAL CONDITION CLASSES

(75) Inventor: Masahiro Mita, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 872 days.

(21) Appl. No.: 12/002,234

(22) Filed: Dec. 14, 2007

(65) Prior Publication Data

US 2008/0148176 A1 Jun. 19, 2008

(30) Foreign Application Priority Data

Dec. 15, 2006 (JP) ................................. 2006-337689
Dec. 10, 2007 (JP) ................................. 2007-317941

(51) Int. Cl.
*G06F 3/048* (2006.01)
(52) U.S. Cl. .................. 715/781; 715/764; 707/728
(58) Field of Classification Search ................ 715/764, 715/781; 707/728
See application file for complete search history.

(56) References Cited

U.S. PATENT DOCUMENTS

| 6,437,811 | B1 * | 8/2002 | Battles et al. | 715/835 |
|---|---|---|---|---|
| 6,983,203 | B1 * | 1/2006 | Wako | 701/208 |
| 2003/0033296 | A1 * | 2/2003 | Rothmuller et al. | 707/3 |
| 2006/0080342 | A1 * | 4/2006 | Takaki | 707/100 |
| 2006/0155757 | A1 * | 7/2006 | Williams et al. | 707/103 R |
| 2007/0245267 | A1 * | 10/2007 | Nakamura et al. | 715/838 |
| 2007/0256026 | A1 * | 11/2007 | Klassen et al. | 715/764 |
| 2008/0222170 | A1 * | 9/2008 | Farnham et al. | 707/100 |
| 2009/0055774 | A1 * | 2/2009 | Joachim | 715/810 |

FOREIGN PATENT DOCUMENTS

| JP | 2001-229186 A | 8/2001 |
|---|---|---|
| JP | 2002-123589 A | 4/2002 |
| JP | 2002-259389 A | 9/2002 |
| JP | 2004-062248 A | 2/2004 |
| JP | 2004-227531 A | 8/2004 |

(Continued)

OTHER PUBLICATIONS

Japanese Office Action (and English translation thereof) dated Dec. 9, 2008, issued in a counterpart Japanese Application.
Japanese Office Action dated Apr. 21, 2009 (6 pages), and English translation thereof (7 pages), issued in counterpart Japanese Application Serial No. 2007-317941.

(Continued)

*Primary Examiner* — Chat C Do
*Assistant Examiner* — Phenuel S Salomon
(74) *Attorney, Agent, or Firm* — Holtz, Holtz, Goodman & Chick, PC

(57) ABSTRACT

When a digital camera is set to retrieval mode, a map-style retrieval screen having a matrix structure is displayed on a display device. The digital camera searches for images photographed in the regions corresponding to each cell in the matrix structure, based on shooting location information appended to the images. The number of found images is displayed within each cell. When the user inputs a zoom in or zoom out command, the regions corresponding to each cell are made smaller or larger, according to the command. At the same time, a new retrieval is performed for images photographed in the regions corresponding to each of the modified cells. The number displayed within each cell is updated according to the number of images found in the new retrieval. When a single cell is selected, a list view of the images photographed in the region corresponding to the selected cell is displayed.

19 Claims, 9 Drawing Sheets

FOREIGN PATENT DOCUMENTS

| | | |
|---|---|---|
| JP | 2005-107867 A | 4/2005 |
| JP | 2005-190087 A | 7/2005 |
| JP | 2006-14237 A | 1/2006 |
| JP | 2006-107260 | 4/2006 |
| JP | 2006-279764 A | 10/2006 |

OTHER PUBLICATIONS

Two Japanese Office Actions dated Sep. 1, 2009 and English translations thereof issued in a counterpart Japanese Application No. 2007-317941.

* cited by examiner

DATA RETRIEVAL DEVICE WITH FUNCTION FOR MODIFYING RETRIEVAL CONDITION CLASSES

BACKGROUND OF THE INVENTION

1. Field of the Invention

The present invention relates to a data retrieval device, a data retrieval method, and a computer-readable recording medium, which are suitable for use in searching data such as image data.

2. Description of the Related Art

When performing searches on image data, conventional data retrieval devices generate a thumbnail image for each image and then display a list view of the thumbnail images on-screen. In addition, when the entire list view cannot be completely displayed on-screen, these data retrieval devices may, for example, cause the list view to scroll on-screen according to user operations, thereby causing all of the thumbnail images to be displayed on the screen. When the user selects a desired thumbnail image from the list view displayed on-screen, the data retrieval device displays on the screen the original image corresponding to the selected thumbnail image.

In addition, there is technology whose object is to allow users to easily search for desired thumbnail images from among a plurality of thumbnail images, described for example in Unexamined Japanese Patent Application Publication No. 2006-14237. Specifically, 2006-14237 describes a technology wherein a list view of thumbnail images is displayed on-screen, with sorting categories (such as image quality or content type categories) arranged horizontally across the screen, and thumbnail images of the images belonging to each category arranged vertically up/down the screen.

However, when a large amount of image data belongs to a single category, the user may have to spend a very long time searching for the desired image data with the technology described in the above specification.

SUMMARY OF THE INVENTION

Being devised in the light of the above circumstances, it is an object of the present invention to provide a data retrieval device, a data retrieval method, and a computer-readable recording medium wherein user-desired data can be searched more efficiently.

In order to achieve the above object, a data retrieval device in accordance with a first aspect of the present invention comprises:

a storage part that stores data;

a retrieval item divider that divides retrieval conditions related to a predetermined retrieval item into a plurality of retrieval condition classes;

a retrieval part that respectively sorts the data stored in the storage part into the plurality of retrieval condition classes formed by the retrieval item divider by searching for data that respectively satisfies the retrieval conditions corresponding to each retrieval condition class;

an output part that respectively associates the plurality of retrieval condition classes with information related to the data sorted into the retrieval condition classes by the retrieval part, and outputs the same;

an input part that receives commands input from a user;

a class unit modifier that further divides a selected retrieval condition class into a plurality of retrieval condition classes when a command selecting one of the retrieval condition classes from among the plurality of retrieval condition classes output by the output part is input into the input part; and a retrieval controller that controls the retrieval part to respectively sort the data that was sorted into the retrieval condition class selected by the input part into the retrieval condition classes formed by the class unit modifier.

In addition, a data retrieval method in accordance with a second aspect of the present invention comprises:

a retrieval item dividing step of dividing retrieval conditions related to a predetermined retrieval item into a plurality of retrieval condition classes;

a first retrieval step of sorting data stored in a storage part into the plurality of retrieval condition classes formed in the retrieval item dividing step by searching for data that respectively satisfies the retrieval conditions corresponding to each retrieval condition class formed in the retrieval item dividing step;

a first outputting step of outputting the plurality of retrieval condition classes formed in the retrieval item dividing step along with information related to the data sorted into the retrieval condition classes in the first retrieval step, the information being respectively associated with the plurality of retrieval condition classes formed in the retrieval item dividing step;

a class unit modifying step of further dividing a selected retrieval condition class into a plurality of retrieval condition classes when a command is input into an input part, the command selecting one of the retrieval condition classes from among the plurality of retrieval condition classes output in the first outputting step;

a second retrieval step of sorting the data that was sorted into the retrieval condition class selected via the input part into the plurality of retrieval condition classes formed in the class unit modifying step by searching for data that respectively satisfies the retrieval conditions corresponding to each retrieval condition class formed in the class unit modifying step; and a second outputting step of outputting the plurality of retrieval condition classes formed in the class unit modifying step along with information related to the data sorted into the retrieval condition classes in the second retrieval step, the information being respectively associated with the plurality of retrieval condition classes formed in the class unit modifying step.

In addition, a computer-readable recording medium in accordance with a third aspect of the present invention stores a program that executes, on a computer the following steps:

a retrieval item dividing step of dividing retrieval conditions related to a predetermined retrieval item into a plurality of retrieval condition classes;

a first retrieval step of sorting data stored in a storage part into the plurality of retrieval condition classes formed in the retrieval item dividing step by searching for data that respectively satisfies the retrieval conditions corresponding to each retrieval condition class formed in the retrieval item dividing step;

a first outputting step of outputting the plurality of retrieval condition classes formed in the retrieval item dividing step along with information related to the data sorted into the retrieval condition classes in the first retrieval step, the information being respectively associated with the plurality of retrieval condition classes formed in the retrieval item dividing step;

a class unit modifying step of further dividing a selected retrieval condition class into a plurality of retrieval condition classes when a command is input into an input part, the command selecting one of the retrieval condition classes from among the plurality of retrieval condition classes output in the first outputting step;

a second retrieval step of sorting the data that was sorted into the retrieval condition class selected via the input part into the plurality of retrieval condition classes formed in the class unit modifying step by searching for data that respectively satisfies the retrieval conditions corresponding to each retrieval condition class formed in the class unit modifying step; and a second outputting step of outputting the plurality of retrieval condition classes formed in the class unit modifying step along with information related to the data sorted into the retrieval condition classes in the second retrieval step, the information being respectively associated with the plurality of retrieval condition classes formed in the class unit modifying step.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

Figure 1:
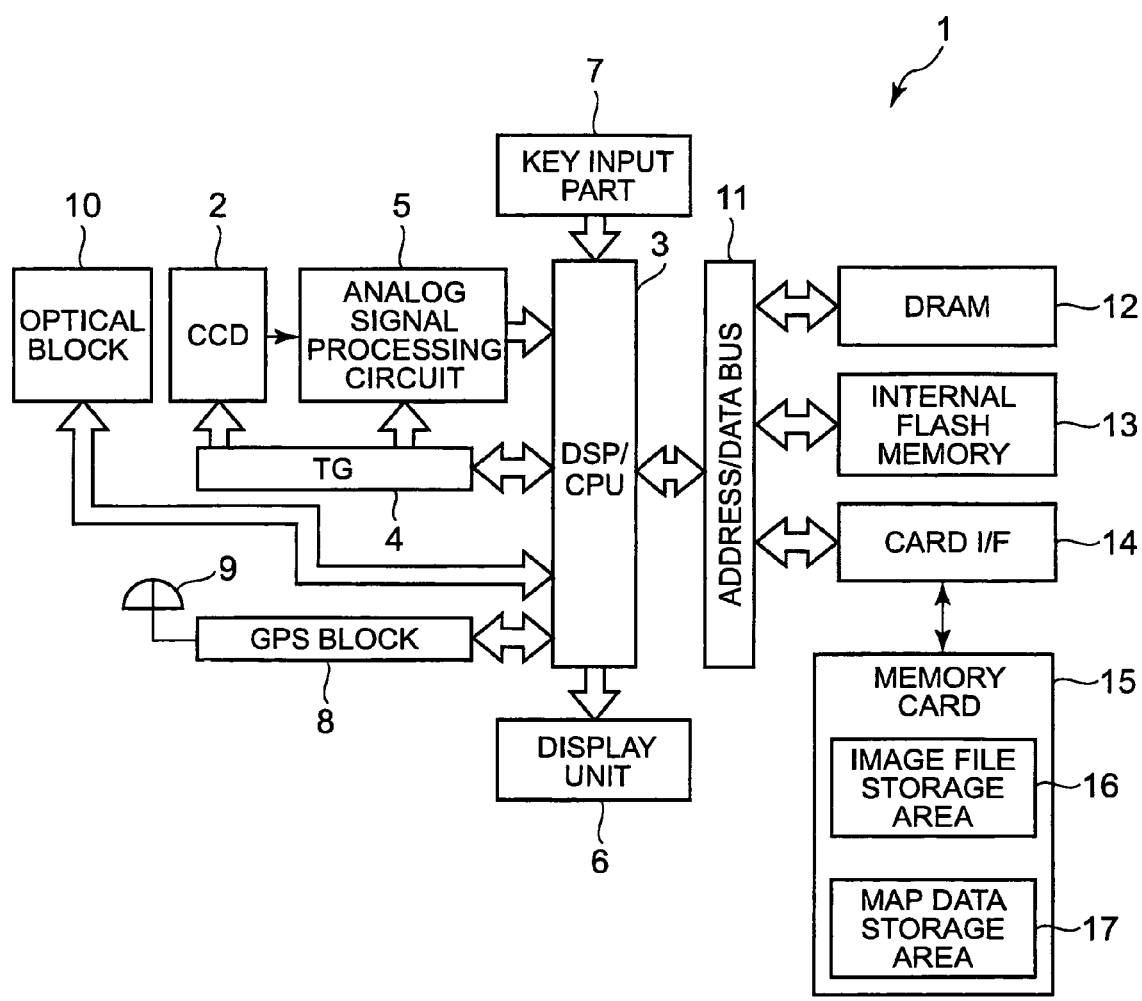
FIG. 1 is a block diagram showing the schematic configuration of a digital camera in accordance with an embodiment of the present invention.

Hereinafter, an embodiment of the present invention will be described with reference to the accompanying drawings. In this embodiment, a digital camera 1, having image data file (image file) retrieval functions, is given as an example of the data retrieval device. FIG. 1 is a block diagram schematically showing the electronic configuration of the digital camera 1 in accordance with an embodiment of the invention.

The digital camera 1 comprises a CCD (charge-coupled device) 2, a DSP/CPU 3, a TG (timing generator) 4, an analog signal processing circuit 5, a display unit 6, a key input part 7, a GPS block 8, an antenna 9, an optical block 10, an address/data bus 11, DRAM 12, internal flash memory 13, and a card interface 14.

The DSP/CPU 3 is a one-chip microcomputer having DSP (digital signal processor) functions for processing digital signals, as well as having CPU (central processing unit) functions for controlling the respective components of the digital camera 1. For example, via its DSP functions, the DSP/CPU 3 executes a variety of digital signal processing, including image data compression/decompression and audio data processing. Moreover, the DSP/CPU 3 also houses a date/time circuit that performs calendar functions for measuring the date/time.

Connected to the DSP/CPU 3 are the TG 4, the analog signal processing circuit 5, the display unit 6, the key input part 7, the GPS block 8, the optical block 10, and the address/data bus 11. The TG 4 provides a timing signal to the CCD 2 and the analog signal processing circuit 5. The CCD 2 is driven according to the timing signal from the TG 4. The CCD 2 converts an optical image formed via a group of lenses in the optical block 10 into an analog imaging signal, and outputs this signal to the analog signal processing circuit 5. The group of lenses in the optical block 10 comprises a focus lens and a zoom lens. In addition, the optical block 10 includes the above-described group of lenses as well as a driving circuit for driving the group of lenses based on commands from the DSP/CPU 3.

The analog signal processing circuit 5 comprises CDS (correlated double sampling), AGC (automatic gain control), and AD (analog-to-digital conversion) circuits. The CDS circuit retains the input analog imaging signal. The AGC circuit is a gain adjustment amplifier, and amplifies the imaging signal retained in the CDS circuit. The AD circuit converts the analog imaging signal amplified in the AGC circuit and converts it into a digital imaging signal. Thus, via the analog signal processing circuit 5, the signal output from the CCD 2 is sent to the DSP/CPU 3 as a digital signal.

Connected to the DSP/CPU 3 via the address/data bus 11 are the DRAM 12, the internal flash memory 13, and the card interface 14. Connected to the card interface 14 is a memory card 15 that may be freely inserted into or removed from a card slot (not shown) in the body of the digital camera 1.

The DRAM 12 is used both as a buffer for temporarily saving data such as image data, and also as a working memory for the DSP/CPU 3. Specifically, the DRAM 12 temporarily saves image data of a photographic subject that was imaged by the CCD 2 and digitized by the analog signal processing circuit 5. When the digital camera 1 is in a ready state to take a photograph during shooting mode (recording mode), the image data temporarily saved in the DRAM 12 is subject to various image processing by the DSP/CPU 3, and then sent to the display unit 6 for display as a through-the-lens image. In addition, when taking a photograph during shooting mode, the image data temporarily saved in the DRAM 12 is compressed (encoded) by the DSP/CPU 3, and is ultimately stored in the memory card 15 as an image file (still image file) in a predetermined format such as the Exif format.

The display unit 6 includes a color LCD (liquid crystal display) and a driving circuit therefor. When in a ready state to take a photograph during shooting mode, the display unit 6 displays an image of the photographic subject imaged by the CCD 2 as a through-the-lens image. When in a review mode for reviewing images stored in the memory card 15, the display unit 6 displays any arbitrary image that has been read and decompressed from the memory card 15 by the DSP/CPU 3.

The key input part 7 includes a plurality of operation keys such as a power key, a mode key, a shutter key, a zoom key, a menu key, cross keys, and a set key. The key input part 7 outputs key input signals to the DSP/CPU 3 in response to operation of the operation key by the user. The mode key is used to set the basic operational mode of the digital camera 1 to shooting mode or review mode.

The MENU key is used to cause the display unit 6 to display a menu screen or similar screen. The menu screen is a screen for configuring various operational modes subordinate to the basic operational modes such as shooting mode and review mode, and also for configuring various operations of the digital camera 1. The cross keys send commands for each of the directions up, down, left, and right. The cross keys are used, for example, to move a cursor when selecting various configuration settings and values being displayed on the menu screen.

Figure 2A:
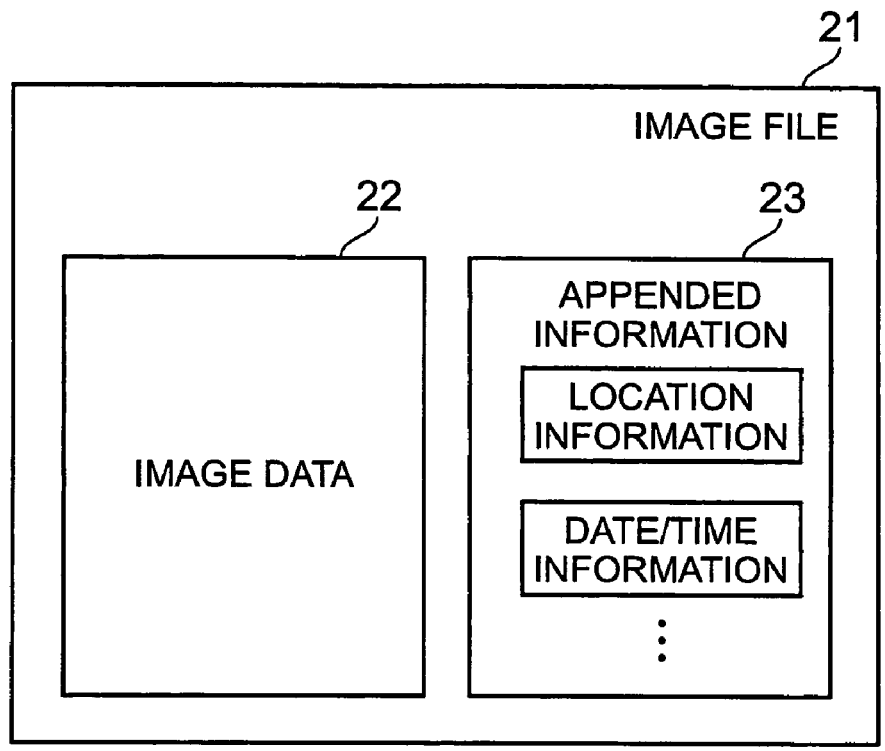
FIG. 2A shows an example of the data structure of an image file.

The GPS block 8 demodulates and deciphers C/A codes in the L1 band sent from a plurality of satellites and received by the antenna 9, thereby acquiring positioning data for the digital camera 1. This positioning data includes information indicating the current location (latitude, longitude, and elevation) of the digital camera 1, as well as the current date/time (calendar date and time of day, etc.). The GPS block 8 sends this acquired positioning data to the DSP/CPU 3. Data from among the positioning data, for example the latitude and longitude data, is then appended to the compressed image data during shooting as location information indicating the place where the photograph was shot. Furthermore, the date/time data acquired from the date/time circuit built in the DSP/CPU 3 is also appended to the compressed image data during shooting as date/time information indicating when the photograph was shot. The image data, including the appended information such as location information and date/time information, is then stored in the memory card 15 as an image file (still image file). It should be appreciated that the date/time data may also be obtained from the positioning data acquired by the GPS block 8. FIG. 2A shows an example of the data structure of an image file. As shown in FIG. 2A, an image file 21 contains image data 22 and appended information 23 related to the image data 22 such as location information and date/time information.

Stored in the internal flash memory 13 are a variety of control programs and data needed by the DSP/CPU 3 to control the various components of the digital camera 1. Among these control programs there is, for example, a program for conducting image data retrieval processing (to be hereinafter described) that is executed when a retrieval mode, an operational sub-mode of review mode, is activated.

Figure 2B:
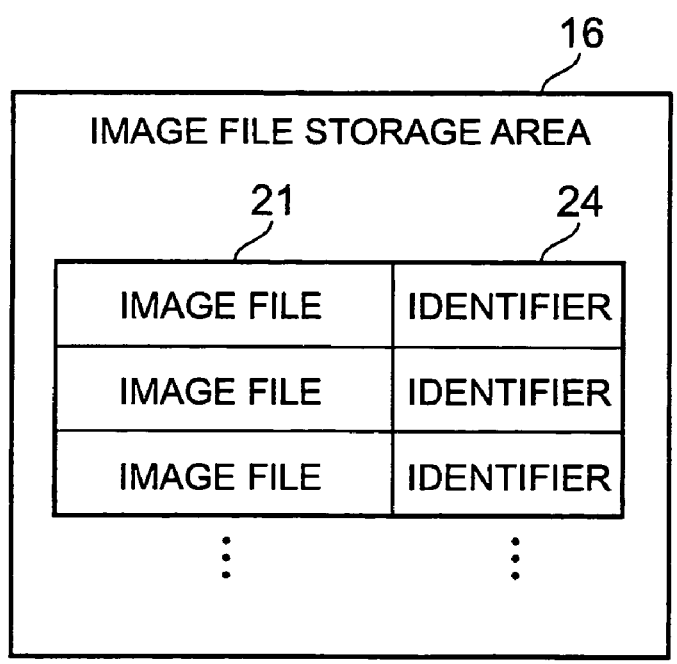
FIG. 2B shows an example of the data structure within an image file storage area.

In addition, an image file storage area 16 for storing image files 21 that contain image data 22, as well as a map data storage area 17 for storing map data, are reserved in the memory card 15. FIG. 2B shows an example of how data is structured within the image file storage area 16. As shown in FIG. 2B, the image files 21 are stored in the image file storage area 16 with associated identifiers 24 for identifying the files. The map data is composed of various data necessary for displaying on the screen of the display unit 6 a map having a plurality of levels (scales) (i.e., an electronic map).

Figure 3A:
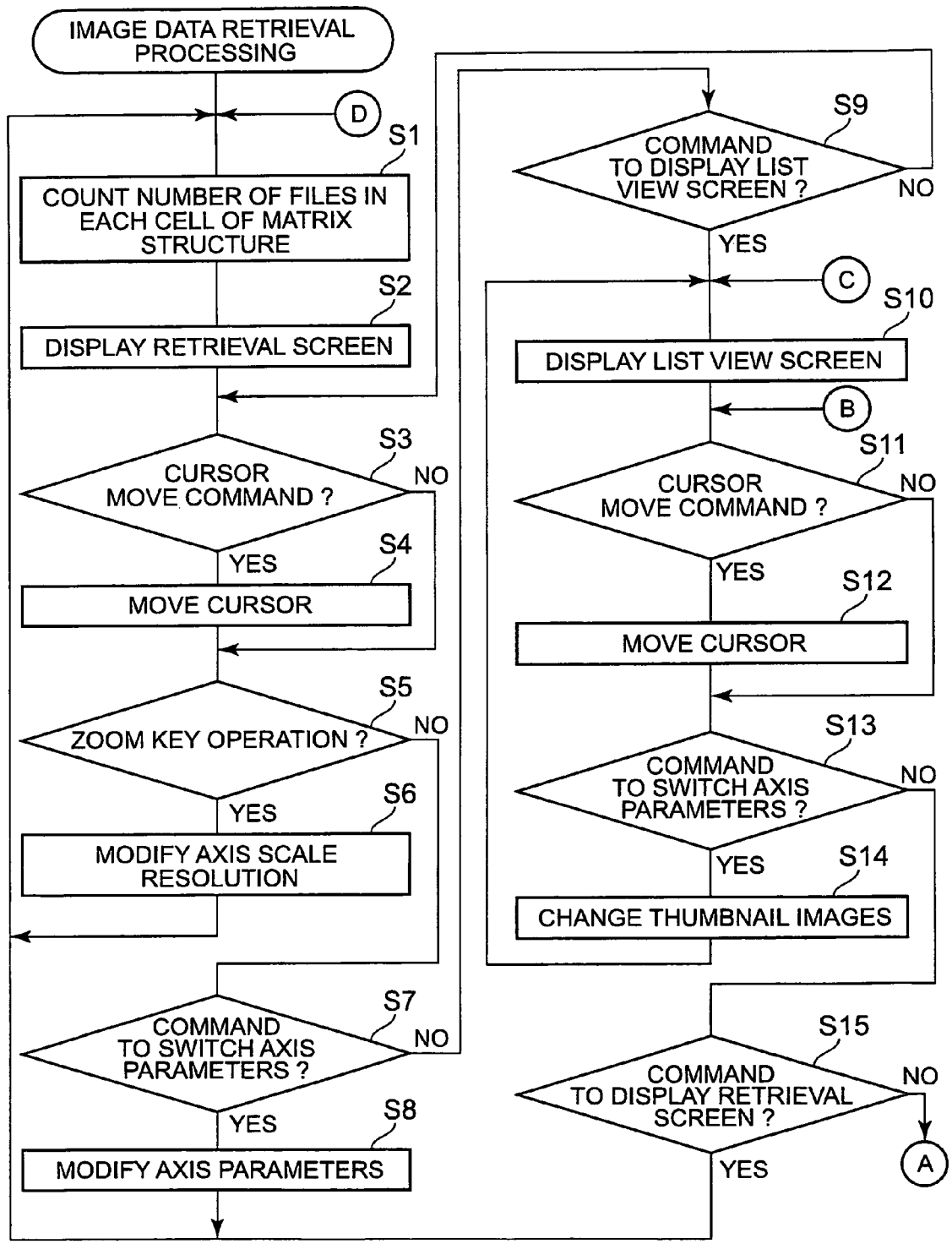
FIGS. 3A and 3B are flowcharts showing the operation of a digital camera in accordance with an embodiment of the present invention.
Figure 3B:
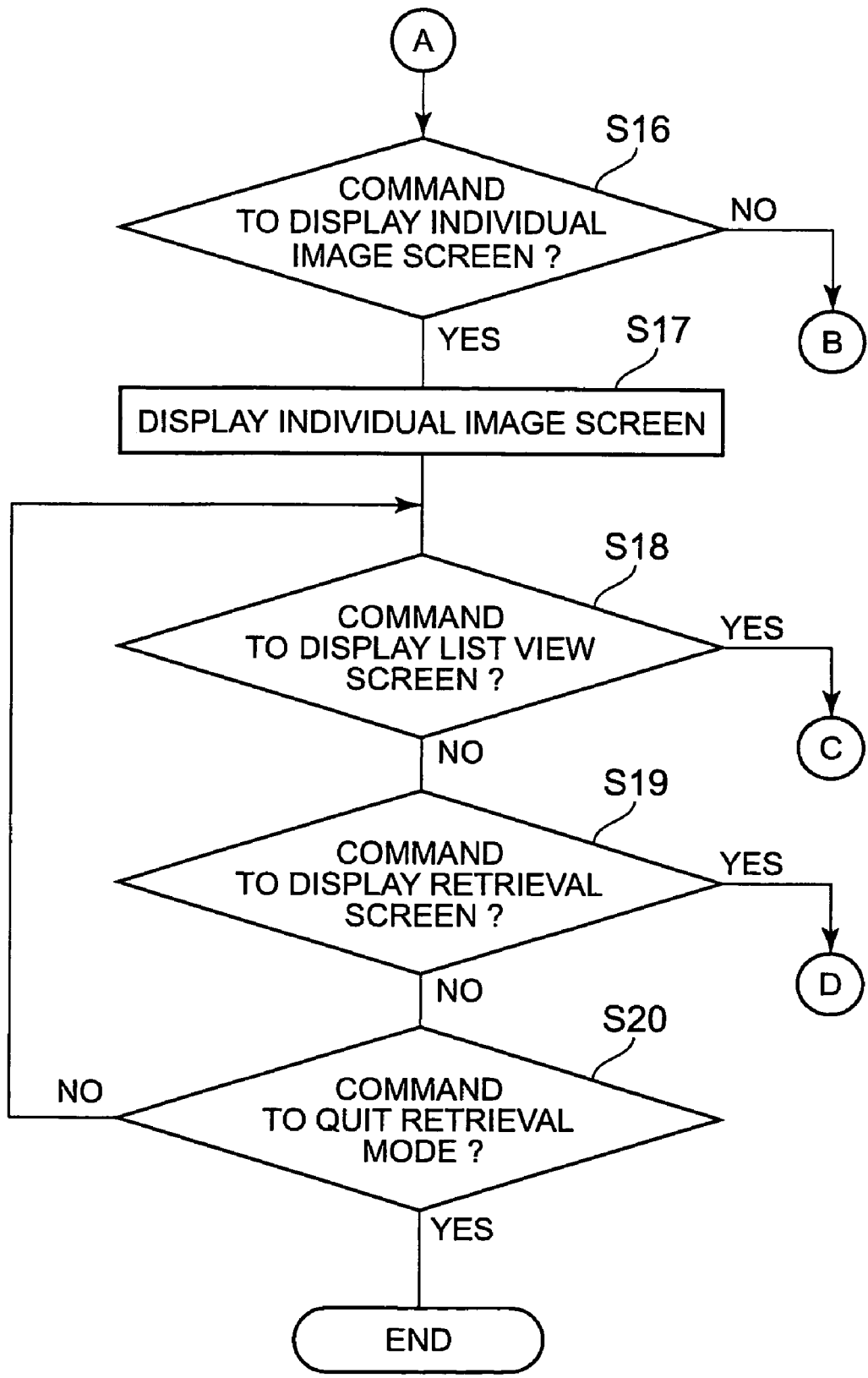

Next, the operation of the digital camera 1 having a configuration as detailed above will be described. FIGS. 3A and 3B are flowcharts showing image data retrieval processing, an operation of the digital camera 1 when set to retrieval mode. Retrieval mode is an operational mode used to search for a user-desired image file from among the plurality of image files (still image files) stored in the memory card 15. In addition, this image data retrieval processing is executed as a result of the DSP/CPU 3 controlling the various components of the digital camera 1 while following a program stored in the internal flash memory 13.

This image data retrieval processing is commenced when the digital camera 1 is set to retrieval mode. First, the DSP/CPU 3 conducts processing for displaying on the display unit 6 a retrieval screen having a matrix structure (mesh structure) defined by vertical and horizontal lines at predetermined intervals.

To accomplish this, the DSP/CPU 3 sorts the plurality of image files 21 (including image data) stored in the memory card 15 into respective cells of the matrix structure based on the appended information 23 contained in the image files 21. The DSP/CPU 3 then counts the number of image files 21 (i.e., the number of images) respectively sorted into each cell (FIG. 3A, step S1). Stated differently, the DSP/CPU 3 searches the images files 21 (image data) sorted into the rectangular positions (referred to as "matrix positions" in the present embodiment) that are formed in the space between the vertical and horizontal gridlines on the retrieval screen, and acquires the number of image files 21 found at each rectangular position.

Subsequently, the DSP/CPU 3 displays a retrieval screen on the display unit 6 wherein the numbers of image files 21 sorted into each cell of the matrix structure are shown within each respective cell (step S2).

Thus, during the initialization of the image data retrieval processing, the number of files (i.e., the number of images) in each cell is evaluated, based on the positioning information contained in the appended information 23. In order to accomplish this, the DSP/CPU 3 reads from the map data storage area 17 of the memory card 15 a map at a predetermined level (scale), and displays a matrix structure defined by latitude and longitude lines at predetermined intervals according to the level of the map as the matrix structure of the retrieval screen.

The default map level that is used immediately after the digital camera 1 is set to retrieval mode is the first level, i.e., the level having the smallest scale (reduction ratio).

Figure 4:
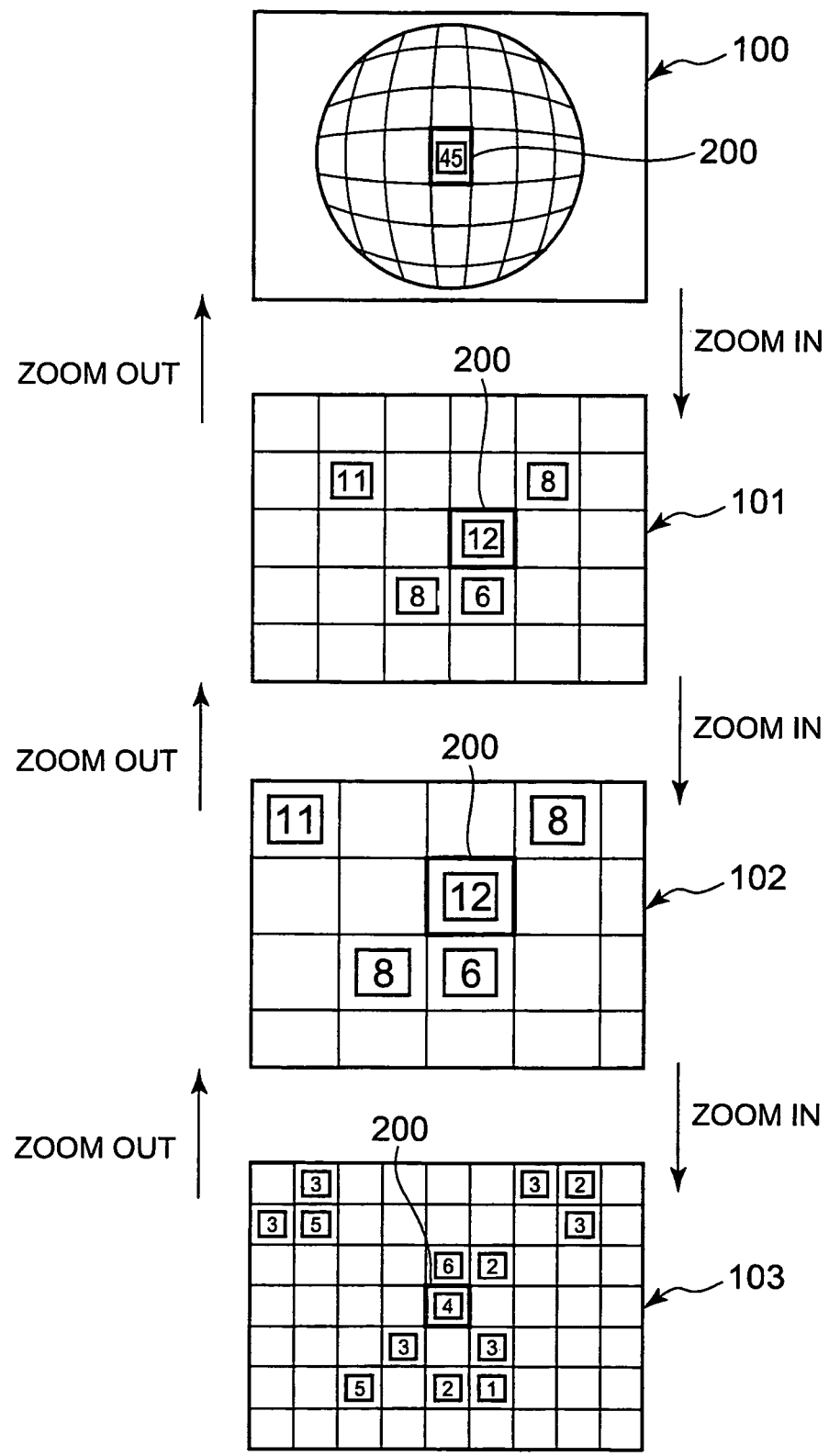
FIG. 4 shows a screen transition example for a map-style retrieval screen.

Specifically, the DSP/CPU 3 displays upon the screen of the display unit 6 a retrieval screen 100 of the first level in the map-style, like that shown in FIG. 4, based on the map data stored in the map data storage area 17. On the retrieval screen 100, a map is displayed wherein latitude and longitude lines are shown at predetermined intervals, the vertical axis parameters representing latitude and the horizontal axis parameters representing longitude. In addition, within each cell defined by these lines of latitude and longitude is displayed the number of files (i.e., the number of images) sorted into that respective cell.

In this case, in each of the cells (matrix positions) on the retrieval screen 100 is displayed the number of files acquired in step S1; in other words, the number of images taken within the region corresponding to each cell is displayed in that cell (in the retrieval screen 100 in FIG. 4, the number "45" is displayed in one of the cells). At the same time, a cursor 200 is displayed overlaid upon an arbitrary cell within the retrieval screen 100.

It should be appreciated that the shape and other features of the map shown in the retrieval screen 100 in FIG. 4 are shown simply for the sake of convenience. Moreover, the retrieval screen 100 showing the first map level need not be only a matrix structure defined by longitude and latitude lines; typical map data indicating topographical or other features may also be displayed overlaid with the matrix structure. In so doing, the user can easily confirm where and how many photographs were taken while looking at an ordinary map, instead of only longitude and latitude information.

In addition, when the retrieval screen 100 is being displayed, the cursor 200 can be moved among cells in the matrix structure by operating the cross keys of the key input part 7. Accordingly, the DSP/CPU 3 monitors the operation of the cross keys by the user, and determines whether or not a cursor move command is given (step S3). If a cursor move command is given (step S3; YES), the DSP/CPU 3 moves the cursor 200 one cell in the direction specified by the command (step S4). If a cursor move command is not given (step S3; NO), step S4 is skipped.

Subsequently, the DSP/CPU 3 determines whether or not the zoom key of the key input part 7 is operated by the user (step S5). If the zoom key is operated (step S5; YES), the DSP/CPU 3 modifies the scale resolution of the vertical and horizontal axes on the retrieval screen 100 according to how the key is operated (step S6). Stated differently, by reducing or enlarging the scale resolution of the axes, the DSP/CPU 3 increases/decreases the class units for the row item and the column item that constitute the conditions for searching the files sorted into each cell. After modifying the scale resolution of the axes, the DSP/CPU 3 updates the retrieval screen by repeating steps S1 and S2, based on the modified scale resolution of the axes.

For example, when the zoom key is operated to give a zoom-in command, the DSP/CPU 3 changes the map on the retrieval screen 100 to a map of a lower level in order to recreate a matrix structure within the region corresponding to the cell selected by the cursor 200. In other words, the DSP/CPU 3 changes the map on the retrieval screen 100 to a more detailed map having a finer scale resolution of latitude and longitude. Thus, the geographical regions corresponding to respective cells in the matrix structure become smaller.

In contrast, when the zoom key is operated to give a zoom-out command, the DSP/CPU 3 changes the map on the retrieval screen 100 to a map of a higher level, with the region corresponding to the cell indicated by the cursor 200 being centered on the screen. In other words, the DSP/CPU 3 changes the map on the retrieval screen to a wider area map having a larger scale resolution of latitude and longitude. Thus, the geographical regions corresponding to respective cells in the matrix structure become larger.

At the same time, for each cell on the new retrieval screen wherein the map has changed, the DSP/CPU 3 counts the number of images photographed within the region corresponding to that cell, and then displays within that cell the number of images determined by the count.

In so doing, when for example the retrieval screen 100 is displayed on the display unit 6 and successive zoom-in commands are given, the retrieval screen changes in the following order (shown in FIG. 4): retrieval screen 100, retrieval screen 101, retrieval screen 102, and retrieval screen 103. In addition, when for example the retrieval screen 103 is displayed on the display unit 6 and successive zoom-out commands are given, the retrieval screen changes in the following order: retrieval screen 103, retrieval screen 102, retrieval screen 101, retrieval screen 100.

However, in the present embodiment, when the map form retrieval screen is updated according to operations of the zoom key, the map level is not switched until after a predetermined number of operations of the zoom key. For example, such as when changing from the retrieval screen 101 to the retrieval screen 102 (shown in FIG. 4) in the case of zooming in, or when changing from the retrieval screen 102 to the retrieval screen 101 in the case of zooming out, the same map level is simply enlarged or reduced and then displayed on the retrieval screen until the zoom key is operated a predetermined number of times. In other words, both the retrieval screens 101 and 102 display the second map level. Retrieval screen 103 displays the third map level.

Thus, as a result of compensating map level transitions by enlarging and reducing the displayed retrieval screen, zooming can be conducted more smoothly, even if there is a relatively small number of map levels with a matrix structure that can be displayed as the retrieval screen.

It should be appreciated that in the case where, for example, a relatively large number of map levels with a matrix structure that can be displayed as the retrieval screen are provided, the levels can be switched without enlarging or reducing the retrieval screen. In addition, even if there is only a small number of map levels provided in the map data storage area 17, the levels can be switched without enlarging or reducing the retrieval screen, according to user decision.

In addition, although in the foregoing embodiment processing like the following is conducted, the invention is not limited thereto. For example, when the user presses the zoom key once, the retrieval screen is enlarged; when the zoom key is pressed once again, the next, more detailed map level is displayed. However, the invention is not limited to the above, and may be configured such that every time the user presses the zoom key the levels are switched. By also enlarging or reducing the retrieval screen when the levels are switched, the levels are made to appear to smoothly switch from one level to another.

In addition, when the zoom key is pressed repeatedly (i.e., when the zoom key is pressed a plurality of times in succession), the levels may be switched while omitting or simplifying the processing to enlarge or reduce the retrieval screen. For example, when the zoom key is pressed, processing to enlarge or reduce the retrieval screen is commenced, and if the zoom key is pressed again during this processing, the processing is aborted and the levels are switched. Furthermore, the levels may also be switched such that when the zoom key is pressed repeatedly, predetermined numbers of levels are skipped according to how the zoom key is pressed repeatedly.

In addition, when the zoom key is held down (i.e., the zoom key is held in a pressed state for an amount of time greater than or equal to a predetermined time), the levels may be switched while omitting or simplifying the processing to enlarge or reduce the retrieval screen. Furthermore, the levels may also be switched such that when the zoom key is held down, predetermined numbers of levels are skipped according to the amount of time the zoom key is held down.

In so doing, program processing load can be alleviated.

If it is determined in step S5 that the zoom key is not operated (step S5; NO), the DSP/CPU 3 determines whether a command to switch the axis parameters is given via a predetermined key operation by the user on the key input part 7 (step S7). If a command to switch the axis parameters is given (step S7; YES), the DSP/CPU 3 modifies the parameters of the vertical and horizontal axes on the retrieval screen (step S8). Specifically, when a map-style retrieval screen is being displayed, the parameters of the horizontal and vertical axes on the retrieval screen are changed from parameters that indicate location (i.e., latitude and longitude) to parameters that indicate date/time. After changing the axis parameters, the DSP/CPU 3 updates the retrieval screen by repeating steps S1 and S2, based on the updated axis parameters.

Figure 5:
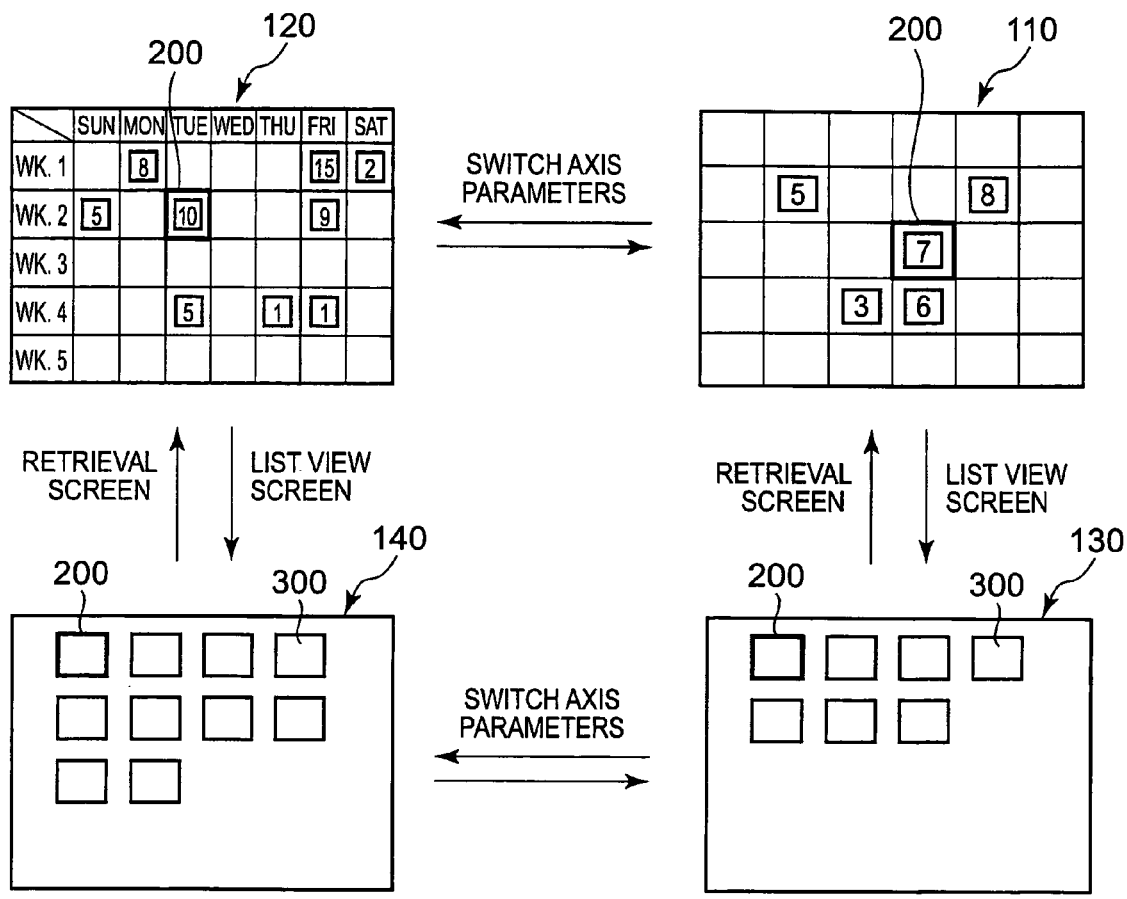
FIG. 5 shows a screen transition example while in retrieval mode.

For example, as shown in FIG. 5, when a map-style retrieval screen 110 having a matrix structure is displayed, wherein the vertical axis parameter represents latitude and the horizontal axis parameter represents longitude, and a command to switch axis parameters is given, the retrieval screen is updated to display a calendar-style retrieval screen 120 having a matrix structure wherein the vertical axis represents weeks (1-5 weeks) and the horizontal axis represents days (Sunday-Saturday).

Specifically, in step S1, the DSP/CPU 3 searches the image files 21 (image data) sorted into the intersecting rectangular positions formed by the gridlines of the new horizontal axis parameter (the column item), days of the week, and the new vertical axis parameter (the row item), weeks. Then, for each intersecting rectangular position, the DSP/CPU 3 acquires the number of image files 21 found by retrieval. In other words, for each cell in the matrix structure of the retrieval screen 120, the DSP/CPU 3 counts the number of images photographed on the date indicated by the combination of the "day" and "week" that corresponds to that cell, based on the date/time information contained in the appended information 23. However, at this point, the DSP/CPU 3 determines the display range of each axis parameter so that the image files 21 that are searched are the images that were photographed within the region corresponding to the cell of the map-style retrieval screen 110 that was being displayed immediately prior to the axis parameter change. In addition, the DSP/CPU 3 may also conduct a search using the axis parameters after the switch, wherein the image files 21 that are searched are the images sorted into the cell that was selected by the cursor 200 on the retrieval screen before the axis parameter change.

Then, in step S2, the DSP/CPU 3 displays on the screen of the display unit 6 a calendar-style retrieval screen 120 like that shown in FIG. 5. At the same time, the DSP/CPU 3 displays the number of the image files acquired in step S1 in the respective cells of the calendar-style retrieval screen 120, as well as the cursor 200 overlaid upon any cell.

As shown in FIG. 5, by changing the axis parameters in this way, the map-style retrieval screen 110 can be switched to the calendar-style retrieval screen 120. At this point, the scale resolution of the axis parameters may be determined for example such that, from among the image files 21 sorted into the cell where the cursor 200 was positioned on the map-style retrieval screen 110, the image file 21 with the most recent (or oldest) date/time information is sorted into a predetermined cell on the calendar-style retrieval screen 120 (the second row in the retrieval screen 120 shown in FIG. 5), and the cursor 200 is displayed over this predetermined cell.

In addition, if the zoom key is operated while the calendar-style retrieval screen is being displayed (step S5; YES), the scale resolution of the vertical and horizontal axes on the calendar-style retrieval screen is modified according to how the key is operated (step S6), and steps S1 and S2 are repeated.

For example, when the zoom key is operated to give a zoom out command, the DSP/CPU 3 modifies the scale resolution of the horizontal axis of the calendar-style retrieval screen in order from day, to week, to month; at the same time, the scale resolution of the vertical axis is modified in order from week, to month, to year. In contrast, when the zoom key is operated to give a zoom in command, the scale resolution of the horizontal axis is modified in order from months, to weeks, to days, while the scale resolution of the vertical axis is modified from years, to months, to weeks. In other words, the level of the calendar-style retrieval screen is modified.

At the same time, for each cell on the new retrieval screen wherein the scale resolution has been modified, the DSP/CPU 3 counts the number of images photographed at the date/time corresponding to that cell, and displays the number of counted images within that cell.

Consider the specific case wherein the scale resolution of the horizontal axis is changed to weeks and the scale resolution of the vertical axis is changed to months by an operation of the zoom key. In step S1, for each cell of the new retrieval screen (i.e., each intersecting rectangular position formed by the horizontal and vertical gridlines), the DSP/CPU 3 searches for the image files 21 that were photographed at a date/time that matches the date/time indicated by the combination of the week and the month corresponding to that cell. In addition, when the scale resolution of the horizontal axis is changed to months and the scale resolution of the vertical axis is changed to years, the DSP/CPU 3, for each cell of the new retrieval screen, searches for image files 21 that were photographed at a date/time that matches the date/time indicated by the combination of the month and the year corresponding to that cell.

Figure 6:
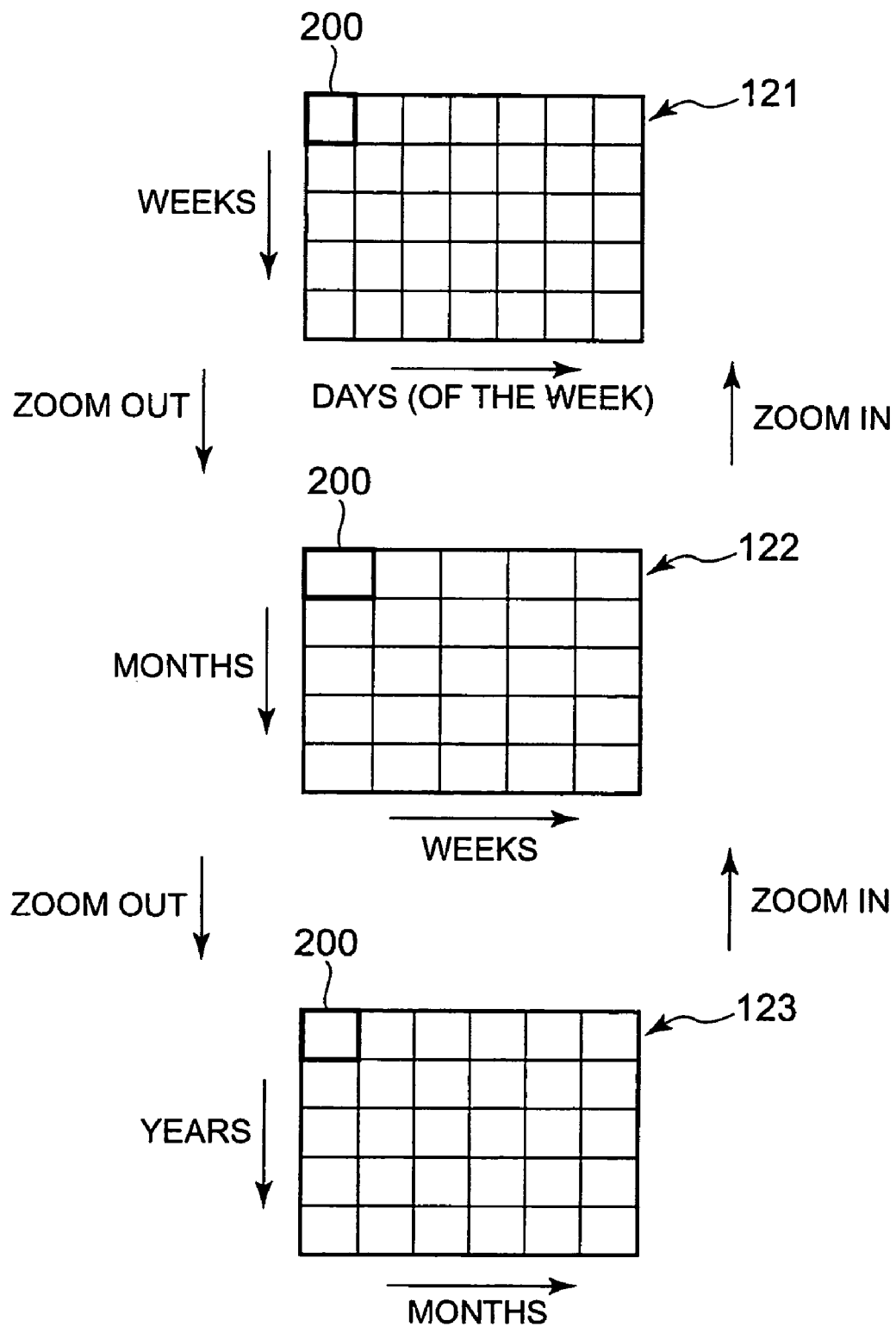
FIG. 6 shows a screen transition example for a calendar-style retrieval screen.

In so doing, when, for example, the calendar-style retrieval screen 121 is displayed on the display unit 6 and successive zoom out commands are given, the retrieval screen 121 changes in order to retrieval screen 122, and then to retrieval screen 123, as shown in FIG. 6. In addition, when, for example, the calendar-style retrieval screen 123 is displayed on the display unit 6 and successive zoom in commands are given, the retrieval screen 123 changes in order to retrieval screen 122, and then to retrieval screen 121. Also, although omitted in FIG. 6, in each cell of the respective calendar-style retrieval screens 121, 122, and 123, the number of image files 21 sorted into that cell is displayed.

In addition, regardless of which calendar-style retrieval screen 121, 122, or 123 shown in FIG. 6 is being displayed, if a command to move the cursor is given (step S3; YES), the DSP/CPU 3 causes the cursor 200 to move one cell in the direction specified by the command (step S4). In the case where all of the cells on the retrieval screen cannot be displayed on one screen of the display unit 6 because the horizontal or vertical axis is months or years (like that of the retrieval screen 122 and 123 shown in FIG. 6), the DSP/CPU 3 causes the retrieval screen to scroll in the horizontal or vertical direction in response to the movement of the cursor 200.

In addition, when the calendar-style retrieval screen (wherein the axis parameters are date/time units) is displayed and a command to switch the axis parameters is given (step S7; YES), the DSP/CPU 3 switches the horizontal and vertical axis parameters from date/time to place (step S8), and then repeats steps S1 and S2. In so doing, when, for example, the calendar-style retrieval screen shown 120 in FIG. 5 is being displayed and a command to switch the axis parameters is given, the map-style retrieval screen 110 shown in FIG. 5 is re-displayed.

In this case, a map having a display range and level (scale) like the following is displayed as the map-style retrieval screen 110. First, the DSP/CPU 3 selects the image having the oldest (or most recent) shooting date/time from among all of the images that were photographed on the date equal to the date specified by the "day" and "week" corresponding to the cell selected by the cursor 200 on the calendar-style retrieval screen 120. Next, the DSP/CPU 3 determines a display range centered on the location where the selected image was photographed, and then displays a map level such that the total number of image files displayed in each cell within the display range is maximized (but within a predetermined limiting value). Alternatively, a map level may be displayed such that the respective numbers of files displayed in each cell within the display range are maximized (but within a predetermined limiting value).

If it is determined in step S7 that a command to switch axis parameters is not given (step S7; NO), the DSP/CPU 3 determines whether or not a command to display a list view screen has been given while either the map-style retrieval screen or the calendar-style retrieval screen is being displayed, via a predetermined key operation (e.g., operation of the set key) on the key input part 7 by the user (step S9). When a command to display the list view screen is given (step S9; YES), the DSP/CPU 3 displays on the display unit 6 a list view screen (step S10). Displayed on the list view screen are thumbnail images corresponding to all of the image files 21 sorted into the particular cell that was selected (by being overlaid with the cursor 200) at the time of the command. At the same time, the cursor 200 is displayed overlaid upon an arbitrary thumbnail image 300.

Specifically, when the command to display the list view screen is given while the map-style retrieval screen 110 in FIG. 5 is being displayed, a list view screen 130 is displayed wherein thumbnail images 300 of all of the images that were photographed within the region corresponding to the selected cell are shown. In addition, when the command to display the list view screen is given while the calendar-style retrieval screen 120 in FIG. 5 is being displayed, a list view 140 is displayed wherein thumbnail images 300 of all the images that were photographed on the day corresponding to the selected cell are shown.

At this point, the plurality of thumbnail images 300 on the list view screen 130 may be arranged, for example, according to distance from the central point of the region corresponding to the cell that was selected in the map-style retrieval screen 110. In addition, the plurality of thumbnail images 300 on the list view screen 140 may be arranged, for example, according to shooting date/time. However, it should be appreciated that the order in which the thumbnail images 300 are arranged on the list view screen is not strictly limited to these arrangement orders. For example, the plurality of thumbnail images 300 may be arranged in order of shooting date/time, even on the list view screen 130 that is displayed in a transition from the map-style retrieval screen 110.

If it is determined in step S9 that a command to display a list view screen is not given (step S9; NO), the DSP/CPU 3 returns to step S3 and waits for commands to be given by the user via key operations while displaying a matrix structure retrieval screen.

While a list view of thumbnail images 300 is being displayed on the list view screen 130 or 140 shown in FIG. 5, the DSP/CPU 3 determines whether a cursor move command is given (step S11). If a cursor move command is given (step S11; YES), the DSP/CPU 3, in response to the command, moves the cursor 200 that is over one thumbnail image 300 to an adjacent thumbnail image 300 in the direction indicated by the command (step S12). In the case where all of the thumbnail images 300 cannot be displayed on one screen of the display unit 6 because of a large number of thumbnail images 300 contained on the list view screen, the DSP/CPU 3 causes the list view screen to scroll according to the movement of the cursor 200, thereby allowing all of the thumbnail images 300 to be displayed.

In addition, while a list view of thumbnail images 300 is being displayed on the list view screen 130 or 140 shown in FIG. 5, the DSP/CPU 3 determines whether or not a command to switch axis parameters is given as a result of a predetermined key operation on the key input part 7 by the user (step S13). If a command to switch the axis parameters is given (step S13; YES), the DSP/CPU 3 changes the thumbnail images 300 displayed on list view screen (step S14). For example, if a command to switch the axis parameters is given while the list view screen 130 is being displayed, the list view screen 140 is displayed; if a command to switch the axis parameters is given while the list view screen 140 is being displayed, the list view screen 130 is displayed.

Specifically, the thumbnail images 300 being displayed on the list view screen are modified according to the following procedure.

When the list view screen being displayed at the time of the command to switch the axis parameters is the list view screen 130 (shown in FIG. 5) that is displayed in a transition from the map-style retrieval screen 110, the DSP/CPU 3 conducts the following. First, the DSP/CPU 3 modifies the axis parameters of the map-style retrieval screen 110 that was being displayed immediately prior to the list view screen 130, thereby generating the calendar-style retrieval screen 120. Next, the DSP/CPU 3 assumes that the calendar-style retrieval screen 120 is being displayed, and changes the thumbnail images currently on the list view screen to the thumbnail images that would be displayed if a command to display the list view screen were given while in the calendar-style retrieval screen.

In addition, when the list view screen being displayed at the time of the command to switch the axis parameters is the list view screen 140 (shown in FIG. 5) that is displayed in a transition from the calendar-style retrieval screen 120, the DSP/CPU 3 conducts the following. First, the DSP/CPU 3 modifies the axis parameters of the calendar-style retrieval screen 120 that was being displayed immediately prior to the list view screen 140, thereby generating the map-style retrieval screen 110. Next, the DSP/CPU 3 assumes that the map-style retrieval screen 110 is being displayed, and changes the thumbnail images currently on the list view screen to the thumbnail images that would be displayed if a command to display the list view screen were given while in the map-style retrieval screen.

After changing the thumbnail images 300, the DSP/CPU 3 returns to step S10 and displays a list view of the changed thumbnail images 300. In so doing, the thumbnail images displayed in the list view are updated from the list view screen 130 to the list view screen 140, or from the list view screen 140 to the list view screen 130, as shown in FIG. 5.

If it is determined in step S13 that a command to switch the axis parameters is not given (step S13; NO), the DSP/CPU 3 determines whether or not a command to display the matrix structure retrieval screen is given as a result of a predetermined key operation by the user on the key input part 7 (step S15). If a command to display the retrieval screen is given (step S15; YES), the DSP/CPU 3 repeats steps S1 and S2, thereby displaying on the display unit 6 the retrieval screen that was being displayed immediately prior to the list view screen. Specifically, the DSP/CPU 3 displays a retrieval screen having a matrix structure (e.g., a map-style or calendar-style retrieval screen) whose horizontal and vertical axis parameters are the axis parameters that were configured when the list view screen was being displayed. In so doing, the display can be switched from the list view screen 130 to the map-style retrieval screen 110, or from the list view screen 140 to the calendar-style retrieval screen 120 (as shown in FIG. 5). The cursor position on the retrieval screen at this point is taken to be over the cell wherein the thumbnail images 300 that were displayed in the list view are sorted.

If it is determined in step S15 that a command to display the retrieval screen is not given (step S15; NO), the DSP/CPU 3 determines whether or not a command to display an individual image screen is given as a result of a predetermined key operation by the user on the key input part 7 (FIG. 3B; step S16). If a command to display an individual image screen is given (step S16; YES), the DSP/CPU 3 displays on the display unit 6 an individual image screen wherein the image data 22 of the image file 21 corresponding to the thumbnail image selected by the cursor 200 on the list view screen is shown (step S17). In other words, the selected thumbnail image 300 is enlarged and displayed in a full-screen view. If a command to display an individual image screen is not given (step S16; NO), the DSP/CPU 3 returns to step S11 and waits for commands to be given by the user via key operations while displaying the list view screen.

While an individual image screen is being displayed, the DSP/CPU 3 determines whether or not a command to display the list view screen is given (step S18). When a command to display the list view screen is given (step S18; YES), the process returns to step S10, and the list view screen that was being displayed immediately prior to the individual image screen is displayed.

If a command to display the list view screen is not given (step S18; NO), the DSP/CPU 3 determines whether or not a command to display the matrix structure retrieval screen is given (step S19). If a command to display the retrieval screen is given (step S19; YES), the process returns to step S1, and either the map-style retrieval screen or the calendar-style retrieval screen is displayed.

If a command to display the retrieval screen is not given (step S19; NO), the DSP/CPU 3 determines whether or not a command to quit retrieval mode is given as a result of a predetermined key operation by the user on the key input part 7 (step S20). If a command to quit retrieval mode is not given (step S20; NO), the process returns to step S18, and the DSP/CPU 3 waits for commands to be given by the user via key operations while displaying the individual image screen. Finally, if a command to quit retrieval mode is given (step S20; YES), this image data retrieval processing ends.

In the above-described flowchart, the image data retrieval processing ends when the determination in step S20 goes to YES. However, it should be appreciated that this image data retrieval processing may also be aborted midway by interrupt processing, such as in the case where the operational mode is changed from retrieval mode to shooting mode, for example.

Moreover, when the image data retrieval processing is aborted, the DSP/CPU 3 may store the aborted process state in the DRAM 12; when the aborted image data retrieval processing is re-activated, the image data retrieval processing may be restored from its aborted state by reading this aborted state from the DRAM 12.

As described in the foregoing, when the user searches for a desired image using the retrieval mode, the user first causes a map-style retrieval screen to be displayed on the display unit 6. Next, the user operates the zoom key to cause the map-style retrieval screen to change like the retrieval screens 100, 101, 102, and 103 shown in FIG. 4. In so doing, the user is able to restrict the number of candidate image files to be confirmed on the list view screen to a suitable number, based on the location where the images were photographed.

In addition, the user is also able to change the map-style retrieval screen into a calendar-style retrieval screen. In this case, the user may for example operate the zoom key to cause the calendar-style retrieval screen to change like the retrieval screens 123, 122, and 121 shown in FIG. 6. In so doing, the user is able to restrict the number of candidate image files to be confirmed on the list view screen to a suitable number, based on the date/time when the images were photographed.

In other words, in retrieval mode, when the user is searching for a desired image among a large number of images stored in the memory card 15, the large number of images are not simply sorted automatically based on shooting location or shooting date/time; rather, the user is able to appropriately adjust the scope of the sorting parameters. Consequently, the user is able to more efficiently retrieve a desired image.

In addition, a map-style retrieval screen used for retrieving images based on shooting location may be switched, if necessary, with a calendar-style retrieval screen used for retrieving images based on shooting date/time. Moreover, as a result, the user is able to further restrict the initially retrieved image files using different retrieval criteria from those of the retrieval before the switch. Consequently, the user is able to more efficiently retrieve a desired image.

The present embodiment is configured such that, when increasing/decreasing the horizontal and vertical axis intervals (i.e., the class units that sub-divide the row and column items) on the map-style retrieval screen using the zoom key, the map levels are not switched until the zoom key has been operated a predetermined number of times, and until the predetermined number of operations is reached, the map is simply enlarged or reduced. However, an embodiment may also be configured wherein the map levels are switched immediately without any relationship to the number of operations of the zoom key; for example, when zooming in the retrieval screen changes from the retrieval screen 101 to the retrieval screen 103, and when zooming out the retrieval screen changes from the retrieval screen 103 to the retrieval screen 101 (shown in FIG. 4). However, by simply enlarging or reducing the map as in the present embodiment, the responsiveness of the interface to zoom key operations is made more natural.

In addition, as shown by way of example in FIG. 4, when switching the map level in the change from the retrieval screen 101 to the retrieval screen 103, single cells are sub-divided into four cells, and the cursor 200 is positioned over the lower-left cell of the four sub-divided cells. However, the configuration is not limited to the above, and the cursor 200 may also be positioned over a cell other than the lower-left cell. Moreover, single cells may also be sub-divided into nine cells. Furthermore, an embodiment may be configured wherein the cells are enlarged by zooming until the cells are sub-divided.

In addition, as shown by way of example in FIG. 4, the regions corresponding to retrieval conditions are configured as square cells. However, the regions corresponding to retrieval conditions may also be configured in shapes other than rectangles, such as for example triangles or hexagons. In so doing, it is possible to increase the freedom of design.

More specifically, in this case the regions corresponding to retrieval conditions may also be constructed using combinations of a plurality of smaller rectangles. For example, a region that is perceived to be a shape other than a rectangle may be constructed using a plurality of very small rectangles. For the cells that lie on the edges of the regions, it is determined in advance which region each cell belongs to. Thus in this case, for each region, the total number of image files found by retrieval that are sorted into the cells belonging to that region is displayed as a number within that region.

In the present embodiment, the case was described wherein the numbers of image files found by retrieval that are sorted into respective cells are displayed as-is (i.e., as a number) in the respective cells (including non-rectangular shapes) of the retrieval screen having either a map-style or calendar-style format. However, the invention may also be configured to display the number of retrieval results indirectly, such as via a graph.

Furthermore, the invention may also be configured to display something other than the number of retrieval results in each cell; for example, a thumbnail image of an image file that is representative of the plurality of image files sorted into a particular cell may be displayed. For example, when in the map-style retrieval screen, the image file whose shooting location is closest to the center of the cell may be used as the representative image file from among the plurality of image files sorted into that cell. In addition, when in the calendar-style retrieval screen, the image file whose shooting date is oldest/newest, etc., may be used as the representative image file from among the plurality of image files sorted into that cell. In addition, the number of retrieval results and a thumbnail image of a representative image file may be displayed together in each cell of the retrieval screen.

In addition, the invention may also be configured such that thumbnail images for the entire plurality of image files sorted into cells on the retrieval screen are displayed in their respective cells, wherein the thumbnail images of a particular cell are displayed reduced in size as the number of image files sorted into that cell increases. In other words, for cells having a large number of images sorted thereinto, small, point-like thumbnail images (or points substituted therefor) are displayed. In so doing, an approximation of how many images are sorted into a particular cell can be ascertained at a glance, simply by observing the state of the thumbnail images.

In addition, the invention may be configured such that thumbnail images and data on the number of retrieval results are displayed together in each cell.

In addition, in the present embodiment, the retrieval screen displayed while in retrieval mode is described by way of example as a map-style retrieval screen, wherein the horizontal and vertical axes represent latitude and longitude, and as a calendar-style retrieval screen, wherein the horizontal and vertical axes represent days, weeks, months, or years. However, other retrieval screens may also be displayed using information other than the above for the horizontal and vertical axes. For example, retrieval screens may also be displayed whose horizontal and vertical axes are suitable combinations of the any of the following: time, temperature, humidity, average color temperature, image size, data size, average R-component value, average G-component value, average B-component value, average M-component value, and average Y-component value.

In addition, in the present embodiment, a list view is displayed when, after displaying a matrix structure retrieval screen, a single cell is selected from among the plurality of cells that comprise the matrix structure. This list view displays thumbnail images of the image files sorted into the selected cell. However, the invention may also be configured such that a matrix structure screen is displayed before searching, and once a single cell is selected, a search is conducted for the images that are sorted into the selected cell. In addition, the invention may also be configured such that, after a single cell is selected, a list view screen is not displayed, but instead a single image from among the plurality of images sorted into the selected cell is displayed on an individual image screen. In this case, the invention may be configured such that other images sorted into the selected cell can be confirmed by switching the image displayed on the individual image screen. In addition, the invention may also be configured such that images are searched using only the matrix structure retrieval screen.

Furthermore, the invention may also be configured such that when the user has selected a single cell on the retrieval screen, the DSP/CPU 3 determines whether or not the number of image files sorted into the selected cell is equal to or less than a predetermined number. If the number of image files is larger than the predetermined number, the DSP/CPU 3 displays a retrieval screen of a lower level, and if the number of image files is equal to or less than the predetermined number, the DSP/CPU 3 displays a list view screen. In so doing, the retrieval screen is made to automatically transit to the list view screen once the number of image files has been restricted to the predetermined number.

In addition, the present embodiment is configured such that the retrieval results for each cell (number of retrieval hits, thumbnail images of the image files found by retrieval, etc.) are displayed in the respective cells of the retrieval screen. However, the present invention is not limited to such an embodiment.

For example, when a cell on the retrieval screen is selected by the cursor, a pop-up window or balloon corresponding to the selected cell may be displayed on the retrieval screen. The retrieval results may thus be displayed inside the pop-up window or balloon. In this case, by displaying the retrieval results inside a pop-up window or balloon, the area wherein the retrieval results are displayed can be enlarged.

In addition, the number of retrieval hits and thumbnail images may also be displayed separately within the cells and within the pop-up windows or balloons, respectively. In this case, since the numbers of retrieval hits and the thumbnail images need not be displayed overlapping each other, it becomes easier for the user to perceive the retrieval results.

For example, the invention may be configured such that, when a single cell is selected while in a state displaying the number of retrieval hits in each cell on the retrieval screen, as shown in FIGS. 4 and 5, a pop-up window or balloon is displayed, and thumbnail images of the image files sorted into the selected cell are displayed within the pop-up window or balloon. In this case, since the thumbnail images can be displayed in a large area, the display size of the thumbnail images can be increased, and thus it becomes easier for the user to perceive the thumbnail images.

In addition, in the present embodiment, it is possible to switch the axis parameters from those of the map-style retrieval screen 110 to the calendar-style retrieval screen 120, as shown in FIG. 5. At this point, a retrieval may also be narrowed by using a "narrowing retrieval" button (not shown) provided on the key input part 7.

Specifically, consider the case wherein the cursor 200 is positioned on a cell wherein seven image files are sorted on the map-style retrieval screen 110, as shown by way of example in FIG. 5. In this state, when the user performs the operation to switch the axis parameters while holding down the "narrowing retrieval" button, a new retrieval is conducted using the retrieval conditions of the calendar-style retrieval screen 120, wherein the images to be searched are only the seven images sorted into the cell over which the cursor 200 is positioned.

Similarly, consider the case wherein the cursor 200 is positioned on a cell wherein ten image files are sorted on the calendar-style retrieval screen 120, as shown by way of example in FIG. 5. In this state, when the user performs the operation to switch the axis parameters while holding down the "narrowing retrieval" button, a new retrieval is conducted using the retrieval conditions of the map-style retrieval screen 110, wherein the images to be searched are only the ten images sorted into the cell over which the cursor 200 is positioned.

By conducting narrowing retrievals such as these, it is, for example, possible to conduct a fine-grained retrieval using two retrieval items such as latitude and longitude, while in addition using two retrieval items such as the day and the week. Thus, the user is able to easily search for a desired image.

Furthermore, the invention may be configured such that, when a "cancel narrowing retrieval" button (not shown) provided on the key input part 7 is pressed, the narrowing retrieval is canceled, and a new search is conducted wherein the images to be searched are those of all of the image files stored in the image file storage area 16.

In addition, narrowing retrieval may also be conducted in multiple stages. Specifically, the invention may be configured such that, after switching the axis parameters while conducting a narrowing retrieval, the retrieval screen level is switched, and then the axis parameters are switched while conducting a narrowing retrieval once again.

In addition, in the present embodiment, when a level of the retrieval screen is switched to the next, more detailed level, single cells are divided into a plurality of cells. However, regions composed of a plurality of cells may also be divided into larger pluralities of cells.

Specifically, a region composed of four cells may be divided into nine cells. Furthermore, the region composed of the nine cells formed by division may be divided into 16 cells. In addition, by combining a method of division such as this with the zoom function, a set region may be successively divided, for example, as follows: [ . . . →4 divisions→zoom→9 divisions→zoom→16 divisions→ . . . ]. In this case, the position of the cursor on the retrieval screen after switching the level may be set to, for example, the cell having the largest portion overlapping the cell over which the cursor was positioned on the previous level. In addition, in the case where there exist a plurality of cells having the largest portion overlapping, the cursor may, for example, be positioned over the cell that is closest to the center of the divided region.

In addition, in the present embodiment, by dividing the retrieval screen into a matrix structure, the regions corresponding to the retrieval conditions are square. In addition, thumbnail images are ordinarily square.

For this reason, by making the regions corresponding to the retrieval conditions square cells, square thumbnail images can be efficiently displayed within those regions. Specifically, by making the shape of the cells and the shape of the thumbnails be similar squares, the proportion of thumbnail image area to cell image area can be increased.

For example, in the case where thumbnail images for all the image files sorted into each cell are respectively displayed within those cells, the individual thumbnail images can be displayed large in size. In addition, in the case where a thumbnail image for an image file that is representative of the image files sorted into each cell is displayed in each cell, the thumbnail images can be displayed at a size identical to the size of the cells.

In this case, since it becomes possible to search while displaying large thumbnail images within the cells, it becomes possible to significantly improve the user's retrieval efficiency.

Furthermore, in cases where the shape of the thumbnail images is not square, the shape of the cells may be set to a shape that is close to the shape of the thumbnail images. Even in this case, by making the shape of the cells similar to the shape of the thumbnail images, representative thumbnail images can be displayed at a size identical to the size of the cells.

In addition, the foregoing description discusses the case wherein the data to be searched is the image data from still images. However, if the digital camera 1 has video recording functions, the data to be searched may also be the image data from video. In addition, if the digital camera 1 has audio recording functions, the data to be searched may also be audio data or audio-attached image data.

In addition, the present invention is not limited to a digital camera, and may also be applied to other devices, including personal computers. Likewise in this case, the data to be searched is not limited to image data, and may be various types of other data, such as audio.

Next, the specific operation of the DSP/CPU 3 when the above-described image data retrieval processing is executed will be described. The following description will describe the case wherein a zoom in command is given as a result of operating the zoom key.

Figure 7:
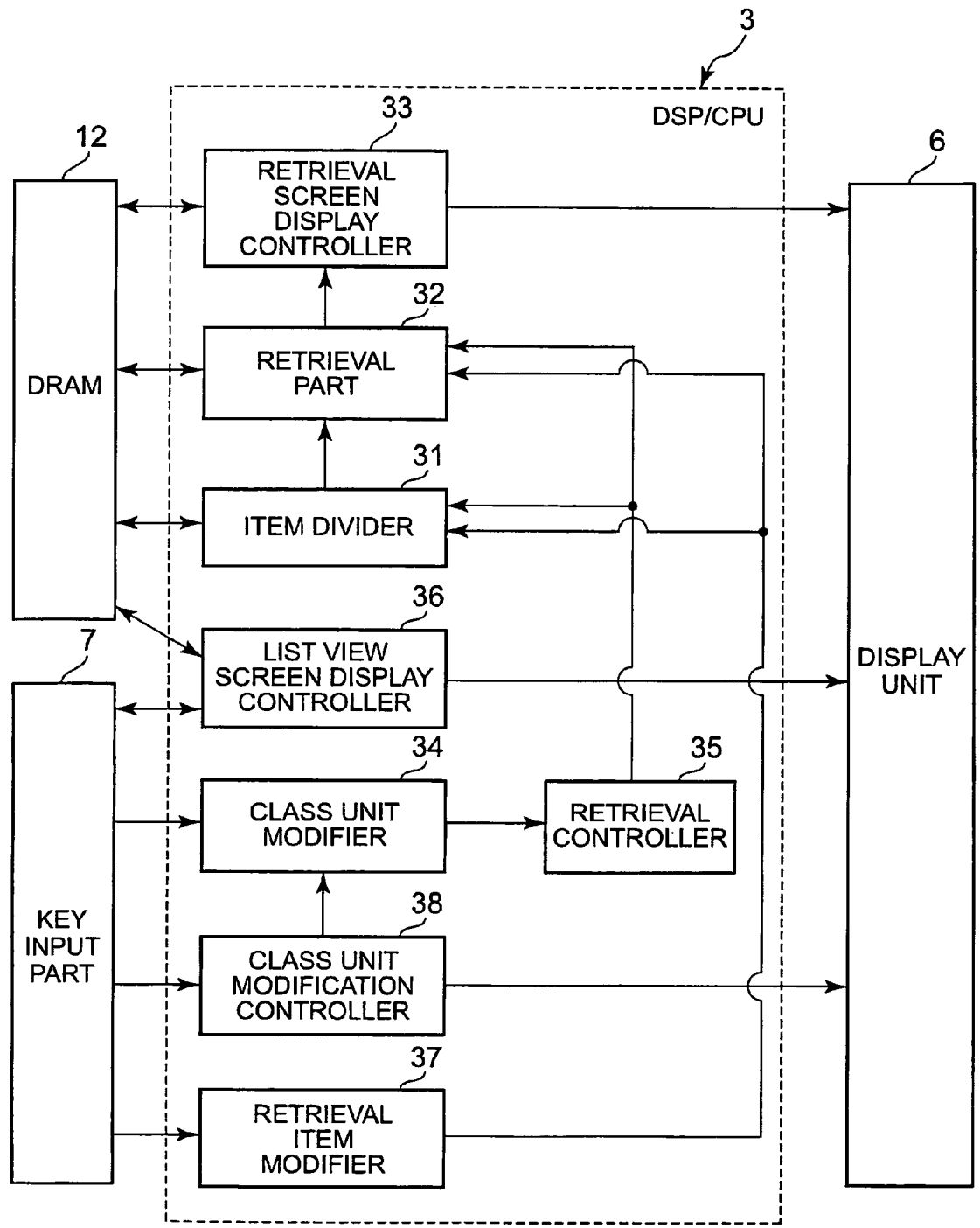
FIG. 7 is a block diagram showing a schematic view of the functional configuration of a DSP/CPU.

FIG. 7 is a block diagram showing a schematic view of the functional configuration of the DSP/CPU 3.

The DSP/CPU 3 comprises an item divider 31, a retrieval part 32, a retrieval screen display controller 33, a class unit modifier 34, a retrieval controller 35, a list view screen display controller 36, a retrieval item modifier 37, and a class unit modification controller 38.

In image data retrieval processing, first, the item divider 31 divides a row item belonging to a retrieval item (i.e., the row retrieval item) using predetermined units, thereby generating a plurality of row retrieval conditions (first retrieval conditions). Furthermore, the item divider 31 divides a column item belonging to the retrieval item (i.e., the column retrieval item) using predetermined units, thereby generating a plurality of column retrieval conditions (second retrieval conditions).

For example, in the case where the retrieval item is shooting location, the item divider 31 sets the row item to latitude, and generates a plurality of row retrieval conditions that are divided by a predetermined latitude scale interval. Furthermore, the item divider 31 sets the column item to longitude, and generates a plurality of column retrieval conditions that are divided by a predetermined longitude scale interval.

Subsequently, the item divider 31 generates a retrieval table 41 wherein retrieval conditions, being combinations of the plurality of row retrieval conditions and the plurality of column retrieval conditions, are respectively associated with matrix positions. The item divider 31 stores this retrieval table 41 in the DRAM 12.

Figure 8:
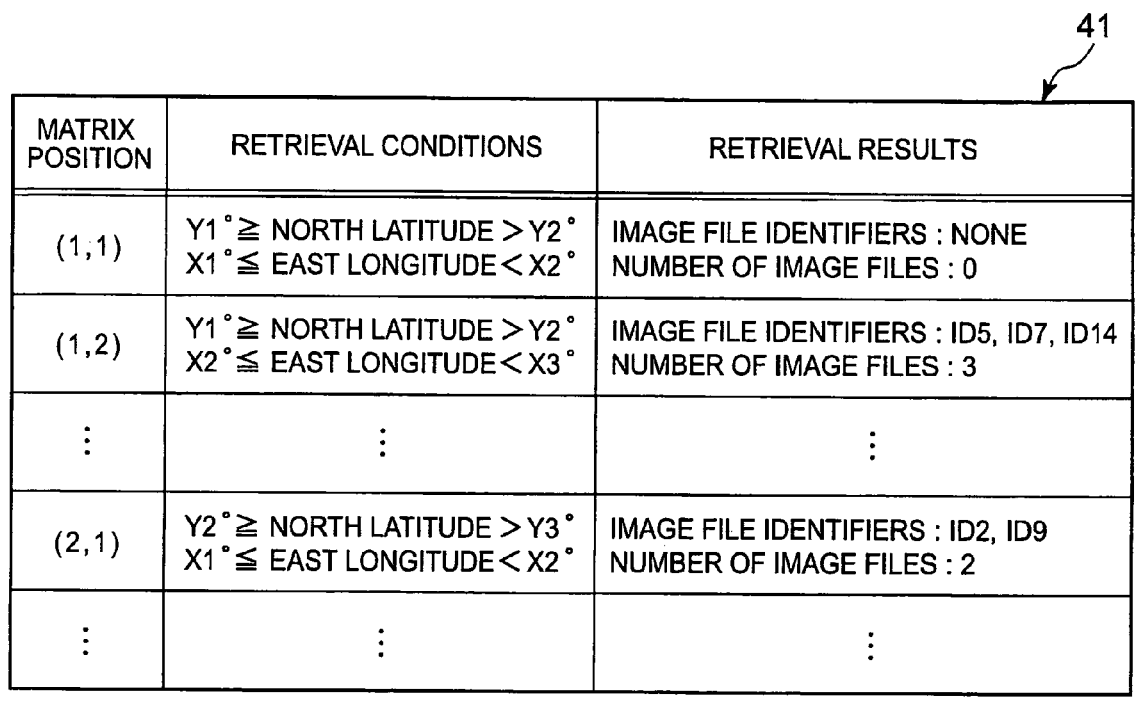
FIG. 8 shows an example of the data structure of a retrieval table.

FIG. 8 shows an example of the data structure of the retrieval table 41. As shown in FIG. 8, the retrieval table 41 mutually associates and stores matrix positions, retrieval conditions, and retrieval results (to be hereinafter described).

The retrieval part 32, taking the image files 21 (image data) stored in the image file storage area 16 of the memory card 15 as the data to be searched, sorts into each matrix position indicated by the retrieval table 41 the image files 21 that satisfy the retrieval conditions for that matrix position. In the retrieval results fields of the retrieval table 41, the retrieval part 32 records the identifiers 24 of the sorted image files 21 and the number of sorted image files 21.

The retrieval screen display controller 33 controls the display unit 6 to cause a retrieval screen based on the retrieval table 41 to be displayed on the display unit 6. Specifically, this retrieval screen has a matrix configuration, wherein the rows are configured to be the plurality of row retrieval conditions, and the columns are configured to be the plurality of column retrieval conditions. Furthermore, the retrieval results information that indicates the retrieval results associated with each matrix position in the retrieval table 41 is respectively disposed in the matrix positions on the retrieval screen. For example, at each matrix position on the retrieval screen, the number of image files 21 sorted into that matrix position is displayed as retrieval results information.

The class unit modifier 34 modifies the class units dividing the row items and the column items according to user commands input via the key input part 7. Specifically, when a command to modify the class units of the row items and the column items, as well as a command selecting a single matrix position (cell) on the retrieval screen displayed by the display unit 6, are input into the key input part 7, the class unit modifier 34 sub-divides the row retrieval conditions and the column retrieval conditions of the selected matrix position.

This modification of the class units of the row and column items by the class unit modifier 34 corresponds to the modification of the scale resolution of the horizontal and vertical axes in step S6 of FIG. 3A.

The retrieval controller 35 controls the item divider 31 and the retrieval part 32 to generate a new retrieval table 41 based on the row retrieval conditions and column retrieval conditions sub-divided by the class unit modifier 34.

Specifically, the item divider 31 generates a new retrieval table 41 wherein retrieval conditions, being combinations of the plurality of sub-divided row retrieval conditions and the plurality of sub-divided column retrieval conditions, are respectively associated with matrix positions. Furthermore, the retrieval part 32, taking the image files 21 sorted into the selected matrix position as the data to be searched, re-sorts into each matrix position indicated by the new retrieval table 41 the image files 21 that satisfy the retrieval conditions for that matrix position.

In so doing, a retrieval screen based on the new retrieval table 41 is displayed on the display unit 6.

Consequently, with the digital camera 1 in accordance with the present embodiment, the user is able to restrict image files by selecting matrix positions in sequence that represent retrieval conditions on a retrieval screen, and thus the user is able to more efficiently retrieve a desired image file.

The list view screen display controller 36 causes a list view screen to be displayed on the display unit 6 according to user commands input via the key input part 7. Specifically, when a command to display a list view, as well as a command selecting a matrix position on the retrieval screen displayed by the display unit 6, are input into the key input part 7, the list view screen display controller 36 refers to the retrieval table 41 and causes the display unit 6 to display a list view of the image files 21 sorted into the selected matrix position.

For example, the list view screen display controller 36 reads from the retrieval table 41 the identifiers 24 of the image files 21 associated with the selected matrix position, and then causes the display unit 6 to display thumbnail images of the image files 21 specified by the identifiers 24. It should be appreciated that the thumbnail images may also be generated from the image data 22 within the image files 21 at the time the list view screen is displayed. In addition, the thumbnail images may also be generated at the time the image files 21 are stored in the image file storage area 16 and subsequently included in the image files 21.

The retrieval item modifier 37 modifies the retrieval item when a command to modify the retrieval item is input into the key input part 7. When the retrieval item is modified, the item divider 31 and the retrieval part 32 generate a new retrieval table 41 based on the modified retrieval item.

For example, when the retrieval item is changed from shooting location to shooting date/time, the retrieval part 32, taking the image-files 21 found by retrieval according to shooting location as the data to be searched, re-sorts the image files 21 using shooting date/time as the retrieval item.

The modification of the retrieval item by the retrieval item modifier 37 corresponds to the modification of the horizontal and vertical axis parameters in step S8 of FIG. 3A.

The class unit modification controller 38 causes the class unit modifier 34 to modify the units by which the row items and the column items are divided when a command to modify the class units is input successively into the key input part 7 a predetermined number of times. Meanwhile, until the command to modify the class units has been input successively into the key input part 7 the predetermined number of times, the class unit modification controller 38 enlarges the retrieval screen displayed in the display unit 6 each time the command is input.

It should be appreciated that in the case where a zoom out command is given by operating the zoom key, the class unit modifier 34 may respectively combine a predetermined number of row retrieval conditions and column retrieval conditions, or the class unit modification controller 38 may reduce the retrieval screen.

In addition, in the present embodiment, the digital camera 1 is described as having an operational program for image data retrieval processing and other functions stored in advance in an internal flash memory 13 or similar component. However, the invention may also be configured as a device that executes the above-described processing by installing such a program on a computer, the program being stored and distributed on a computer-readable recording medium such as a flexible disk, CD-ROM (compact disc read-only memory), DVD (digital versatile disc), or MO (magneto-optical disk).

In addition, the program may also be stored on a disk or similar device residing in predetermined server on a communications network such as the Internet; the program may then be downloaded to computers by, for example, superimposing the program onto a carrier wave. In addition, the invention may also be configured such that, when various input commands are sent to a server from a user's computer, a program residing on the server is executed, and the processing results are then output to the user's computer. In addition, the invention may also be configured such that execution of the program is shared between the server and the user's computer. Furthermore, the above-described processing can be achieved by launching and executing the program as it is being transmitted via a communications network.

In addition, the personal computer that communicates with the above-described server is not limited to a personal computer, and may also be a digital camera, PDA, or other device.

In addition, in cases wherein the above-described functions are realized with contributions from an OS (operating system), or by cooperation between an OS and an application, only the portions other than the OS need be stored and distributed on a medium or downloaded to a computer.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application Nos. 2006-337689 filed on Dec. 15, 2006 and 2007-317941 filed on Dec. 10, 2007, and including specification, claims, drawings and summary. The disclosures of the above Japanese Patent Applications are incorporated herein by reference in their entireties.

What is claimed is:

1. A data retrieval device, comprising:
   a storage part that stores data;
   a retrieval item divider that divides retrieval conditions related to a predetermined retrieval item into a plurality of retrieval condition classes;
   a retrieval part that respectively sorts the data stored in the storage part into the plurality of retrieval condition classes formed by the retrieval item divider by searching for data that respectively satisfies the retrieval conditions corresponding to each retrieval condition class;
   an output part that respectively associates the plurality of retrieval condition classes with information related to the data sorted into the retrieval condition classes by the retrieval part, and outputs the same;
   an input part that receives commands input from a user;
   a class unit modifier that further divides a selected retrieval condition class into a plurality of retrieval condition classes when a command selecting one of the retrieval condition classes from among the plurality of retrieval condition classes output by the output part is input into the input part; and a retrieval controller that controls the retrieval part to respectively sort the data that was sorted into the retrieval condition class selected by the input part into the retrieval condition classes formed by the class unit modifier;

wherein the output part includes a display part that partitions a retrieval screen into a matrix structure, respectively associates regions of matrix positions in the matrix structure with the plurality of retrieval condition classes, and displays information related to the data sorted into each retrieval condition class in the corresponding region;

wherein the retrieval conditions comprise combinations of a plurality of first retrieval conditions, which are formed by dividing a row retrieval item belonging to the predetermined retrieval item into predetermined class units which are set as rows of the matrix structure, and a plurality of second retrieval conditions, which are formed by dividing a column retrieval item belonging to the predetermined retrieval item into predetermined class units which are set as columns of the matrix structure;

wherein the retrieval part respectively associates the retrieval condition classes with the matrix positions, and respectively sorts data that satisfies the retrieval conditions corresponding to a particular matrix position into that particular matrix position;

wherein the display part displays retrieval results information, which indicates the retrieval results of the retrieval part, in the respective matrix positions, the retrieval results information respectively corresponding to the data sorted by the retrieval part into the respective matrix positions;

wherein the class unit modifier modifies the class units dividing the row retrieval item and the class units dividing the column retrieval item for a selected matrix position when a command to modify the class units and a command selecting a single matrix position from among the matrix positions displayed by the display part is input into the input part;

wherein the retrieval controller respectively associates retrieval conditions with matrix positions and causes the retrieval part to sort data, the retrieval conditions being combinations of the plurality of first retrieval conditions and the plurality of second retrieval conditions divided by the class units that were modified by the class unit modifier, and the data being the data that was sorted into the matrix position selected via the input part;

wherein the data retrieval device further comprises a class unit modification controller that controls the class unit modifier to modify the class units dividing the row retrieval item and the class units dividing the column retrieval item when a command to modify the class units is input a predetermined number of times into the input part, and additionally, enlarges the retrieval screen displayed by the display part every time the command to modify the class units is input until the command is input the predetermined number of times into the input part; and wherein when the command to modify the class units is input the predetermined number of times so as to perform class modification, the retrieval screen is modified in accordance with the class modification such that the rows and columns of the matrix structure are respectively set to correspond only to the modified class units, and not to the respective class units previously set as the rows and columns of the matrix structure before the class modification was performed.

2. The data retrieval device according to claim 1, wherein: the data comprises image data.

3. The data retrieval device according to claim 2, wherein: the retrieval results information respectively arranged into the matrix positions by the display part includes image data respectively sorted into the matrix positions by the retrieval part.

4. The data retrieval device according to claim 3, wherein: the display part displays, in a matrix position where retrieval results information is displayed, all of the images corresponding to image data sorted into that matrix position by the retrieval part.

5. The data retrieval device according to claim 4, wherein: the display part displays all images corresponding to image data sorted into a matrix position, wherein an image display size is reduced in accordance with an increase in a number of images corresponding to the image data sorted by the retrieval part.

6. The data retrieval device according to claim 3, wherein: the display part displays, in a matrix position where retrieval results information is displayed, a single image representative of a plurality of images corresponding to image data respectively sorted into that matrix position by the retrieval part.

7. The data retrieval device according to claim 2, wherein: the predetermined retrieval item comprises a location where an image was photographed, and the row retrieval item and the column retrieval item comprise latitude and longitude, respectively.

8. The data retrieval device according to claim 7, wherein: the display part displays the retrieval results information respectively arranged in the matrix positions overlaid with a map having regions corresponding to the matrix structure, wherein a plurality of first retrieval conditions divided according to predetermined units of latitude is set as the rows, and a plurality of second retrieval conditions divided according to predetermined units of longitude is set as the columns.

9. The data retrieval device according to claim 2, wherein: the predetermined retrieval item comprises a date/time when an image was photographed;

the row retrieval item and the column retrieval item both comprise the date/time; and wherein the class units dividing the row retrieval item into a plurality of first retrieval conditions differ from the class units dividing the column retrieval item into a plurality of second retrieval conditions.

10. The data retrieval device according to claim 2, wherein: the retrieval results information respectively arranged into the matrix positions by the display part includes information related to a sum total number of discrete image data respectively sorted into each of the matrix positions by the retrieval part.

11. The data retrieval device according to claim 1, further comprising:

a list view output controller that causes a list view of the data sorted into a selected retrieval conditions class to be output when a command to display a list view and a command selecting a single retrieval condition class from among the plurality of retrieval condition classes output by the output part are input into the input part.

12. The data retrieval device according to claim 1, further comprising:
a retrieval item modifier that changes the predetermined retrieval item to another retrieval item when a command to modify the retrieval item is input into the input part;
wherein the retrieval item divider divides retrieval conditions related to the retrieval item modified by the retrieval item modifier into a plurality of retrieval condition classes; and
wherein the retrieval part respectively re-sorts data into the plurality of retrieval condition classes formed by the retrieval item divider, the data being the data found by retrieval using the predetermined retrieval item.

13. The data retrieval device according to claim 1, wherein:
when a command to modify the class units is input into the input part while the class unit modification controller is enlarging the retrieval screen displayed by the display part, the class unit modification controller aborts enlargement processing and controls the class unit modifier to modify the class units dividing the row retrieval item and the class units dividing the column retrieval item.

14. The data retrieval device according to claim 1, wherein:
when a command to modify the class units is continuously input into the input part for a time greater than or equal to a predetermined time, the class unit modification controller curtails processing to enlarge the retrieval screen being displayed by the display part and controls the class unit modifier to modify the class units dividing the row retrieval item and the class units dividing the column retrieval item.

15. The data retrieval device according to claim 1, wherein:
the class unit modification controller controls the class unit modifier to modify the class units dividing the row retrieval item and the class units dividing the column retrieval item by one gradation when a command to modify the class units is input the predetermined number of times into the input part, and additionally, controls the class unit modifier to modify the units dividing the row retrieval item and the units dividing the column retrieval item by a plurality of gradations when a command to modify the class units is continuously input into the input part for a time greater than or equal to a predetermined time.

16. The data retrieval device according to claim 1, wherein:
the information related to data sorted into the retrieval condition classes output by the output part includes numbers indicating a sum total amount of data respectively sorted into each of the retrieval condition classes by the retrieval part.

17. The data retrieval device according to claim 1, wherein:
the predetermined retrieval item comprises a parameter related to information appended to the data to be searched.

18. A data retrieval method, comprising:
a retrieval item dividing step of dividing retrieval conditions related to a predetermined retrieval item into a plurality of retrieval condition classes;
a first retrieval step of sorting data stored in a storage part into the plurality of retrieval condition classes formed in the retrieval item dividing step by searching for data that respectively satisfies the retrieval conditions corresponding to each retrieval condition class formed in the retrieval item dividing step;
a first outputting step of outputting the plurality of retrieval condition classes formed in the retrieval item dividing step along with information related to the data sorted into the retrieval condition classes in the first retrieval step, the information being respectively associated with the plurality of retrieval condition classes formed in the retrieval item dividing step;
a class unit modifying step of further dividing a selected retrieval condition class into a plurality of retrieval condition classes when a command is input into an input part, the command selecting one of the retrieval condition classes from among the plurality of retrieval condition classes output in the first outputting step;
a second retrieval step of sorting the data that was sorted into the retrieval condition class selected via the input part into the plurality of retrieval condition classes formed in the class unit modifying step by searching for data that respectively satisfies the retrieval conditions corresponding to each retrieval condition class formed in the class unit modifying step; and
a second outputting step of outputting the plurality of retrieval condition classes formed in the class unit modifying step along with information related to the data sorted into the retrieval condition classes in the second retrieval step, the information being respectively associated with the plurality of retrieval condition classes formed in the class unit modifying step;
wherein the first and second outputting steps each include a display step of partitioning a retrieval screen into a matrix structure, respectively associating regions of matrix positions in the matrix structure with the plurality of retrieval condition classes, and displaying information related to the data sorted into each retrieval condition class in the corresponding region;
wherein the retrieval conditions comprise combinations of a plurality of first retrieval conditions, which are formed by dividing a row retrieval item belonging to the predetermined retrieval item into predetermined class units which are set as rows of the matrix structure, and a plurality of second retrieval conditions, which are formed by dividing a column retrieval item belonging to the predetermined retrieval item into predetermined class units which are set as columns of the matrix structure;
wherein the first and second retrieval steps each comprise respectively associating the retrieval condition classes with the matrix positions, and respectively sorting data that satisfies the retrieval conditions corresponding to a particular matrix position into that particular matrix position;
wherein the display step comprises displaying retrieval results information, which indicates the retrieval results of the first and second retrieval steps, in the respective matrix positions, the retrieval results information respectively corresponding to the data sorted by the first and second retrieval steps into the respective matrix positions;
wherein the class unit modifying step comprises modifying the class units dividing the row retrieval item and the class units dividing the column retrieval item for a selected matrix position when a command to modify the class units and a command selecting a single matrix position from among the matrix positions displayed in the display step is input into the input part;
wherein the second retrieval step comprises respectively associating retrieval conditions with matrix positions and sorting data, the retrieval conditions being combinations of the plurality of first retrieval conditions and the plurality of second retrieval conditions divided by the class units that were modified in the class unit modifying step, and the data being the data that was sorted into the matrix position selected via the input part;

wherein the method further comprises a second class unit modifying step of modifying the class units dividing the row retrieval item and the class units dividing the column retrieval item when a command to modify the class units is input a predetermined number of times into the input part, and additionally, enlarging the retrieval screen displayed by the display part every time the command to modify the class units is input until the command is input the predetermined number of times into the input part; and wherein when the command to modify the class units is input the predetermined number of times so as to perform class modification, the retrieval screen is modified in accordance with the class modification such that the rows and columns of the matrix structure are respectively set to correspond only to the modified class units, and not to the respective class units previously set as the rows and columns of the matrix structure before the class modification was performed.

19. A non-transitory computer-readable recording medium having a program stored thereon that is executable by a computer to perform processes comprising:

a retrieval item dividing step of dividing retrieval conditions related to a predetermined retrieval item into a plurality of retrieval condition classes;

a first retrieval step of sorting data stored in a storage part into the plurality of retrieval condition classes formed in the retrieval item dividing step by searching for data that respectively satisfies the retrieval conditions corresponding to each retrieval condition class formed in the retrieval item dividing step;

a first outputting step of outputting the plurality of retrieval condition classes formed in the retrieval item dividing step along with information related to the data sorted into the retrieval condition classes in the first retrieval step, the information being respectively associated with the plurality of retrieval condition classes formed in the retrieval item dividing step;

a class unit modifying step of further dividing a selected retrieval condition class into a plurality of retrieval condition classes when a command is input into an input part, the command selecting one of the retrieval condition classes from among the plurality of retrieval condition classes output in the first outputting step;

a second retrieval step of sorting the data that was sorted into the retrieval condition class selected via the input part into the plurality of retrieval condition classes formed in the class unit modifying step by searching for data that respectively satisfies the retrieval conditions corresponding to each retrieval condition class formed in the class unit modifying step; and a second outputting step of outputting the plurality of retrieval condition classes formed in the class unit modifying step along with information related to the data sorted into the retrieval condition classes in the second retrieval step, the information being respectively associated with the plurality of retrieval condition classes formed in the class unit modifying step;

wherein the first and second outputting steps each include a display step of partitioning a retrieval screen into a matrix structure, respectively associating regions of matrix positions in the matrix structure with the plurality of retrieval condition classes, and displaying information related to the data sorted into each retrieval condition class in the corresponding region;

wherein the retrieval conditions comprise combinations of a plurality of first retrieval conditions, which are formed by dividing a row retrieval item belonging to the predetermined retrieval item into predetermined class units which are set as rows of the matrix structure, and a plurality of second retrieval conditions, which are formed by dividing a column retrieval item belonging to the predetermined retrieval item into predetermined class units which are set as columns of the matrix structure;

wherein the first and second retrieval steps each comprise respectively associating the retrieval condition classes with the matrix positions, and respectively sorting data that satisfies the retrieval conditions corresponding to a particular matrix position into that particular matrix position;

wherein the display step comprises displaying retrieval results information, which indicates the retrieval results of the first and second retrieval steps, in the respective matrix positions, the retrieval results information respectively corresponding to the data sorted by the first and second retrieval steps into the respective matrix positions;

wherein the class unit modifying step comprises modifying the class units dividing the row retrieval item and the class units dividing the column retrieval item for a selected matrix position when a command to modify the class units and a command selecting a single matrix position from among the matrix positions displayed in the display step is input into the input part;

wherein the second retrieval step comprises respectively associating retrieval conditions with matrix positions and sorting data, the retrieval conditions being combinations of the plurality of first retrieval conditions and the plurality of second retrieval conditions divided by the class units that were modified in the class unit modifying step, and the data being the data that was sorted into the matrix position selected via the input part;

wherein the method further comprises a second class unit modifying step of modifying the class units dividing the row retrieval item and the class units dividing the column retrieval item when a command to modify the class units is input a predetermined number of times into the input part, and additionally, enlarging the retrieval screen displayed by the display part every time the command to modify the class units is input until the command is input the predetermined number of times into the input part; and wherein when the command to modify the class units is input the predetermined number of times so as to perform class modification, the retrieval screen is modified in accordance with the class modification such that the rows and columns of the matrix structure are respectively set to correspond only to the modified class units, and not to the respective class units previously set as the rows and columns of the matrix structure before the class modification was performed.

* * * * *